UNITED STATES PATENT OFFICE.

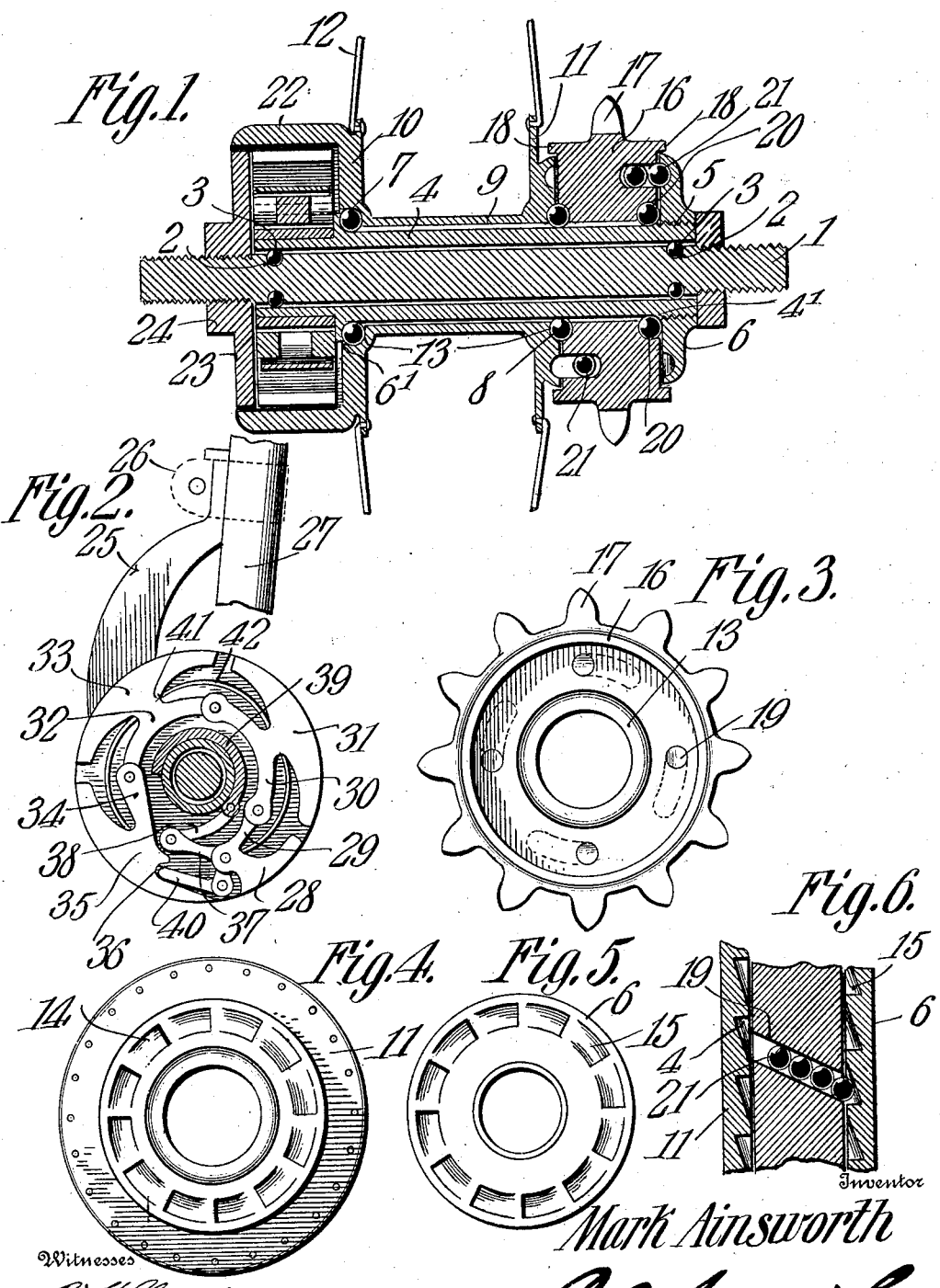

MARK AINSWORTH, OF SEDALIA, MISSOURI.

COASTER-BRAKE.

No. 897,952.  Specification of Letters Patent.  Patented Sept. 8, 1908.

Application filed October 12, 1907. Serial No. 397,164.

*To all whom it may concern:*

Be it known that I, MARK AINSWORTH, a citizen of the United States, residing at Sedalia, in the county of Pettis and State of Missouri, have invented a new and useful Coaster-Brake, of which the following is a specification.

This invention has reference to improvements in coaster brakes for bicycles, and its object is to provide a means whereby the braking operation is rendered positive, with large bearing surfaces for the brake shoes, so that on back-pedaling the wheel may be checked or brought to a standstill with a minimum amount of exertion on the part of the rider.

The invention comprises essentially a wheel hub having at one end an enlargement forming a chamber in which is housed a number of connected brake shoes, means for normally maintaining the shoes out of engagement with the wall of the chamber, and connections with a movable part by means of which the brake shoes may be brought into engagement with the wall of the chamber and so restrict or stop the movement of the hub as desired, depending upon the amount of pressure exerted by the brake shoes against the wall of the chamber formed on the hub.

The hub of the wheel is under the control of the usual sprocket pinion to which power is applied from the pedals through the medium of a sprocket chain, although the invention is equally applicable to the chainless type of wheels, in which case the sprocket will be replaced by a bevel pinion. The sprocket wheel is provided with a number of diagonal ball ways and these ways are in operative relation to toothed members, one comprising one head of the hub and the other being fixed to a member interior to the hub which carries the means for operating the brake shoes. The construction is such that when the sprocket pinion is moving in the forward direction it is clutched to the hub and so imparts to the wheel a rotative movement, while if the movement of the sprocket wheel be stopped and pressure be brought thereon to reverse its direction of movement, then the ball clutching members will engage the toothed member which, in turn, is arranged to cause the brake shoes to move into engagement with the hub member and so retard or stop the same, as desired.

The invention will be best understood by reference to the following detailed description, taken in connection with the accompanying drawings forming part of this specification, in which,—

Figure 1 is a central section of the improved coaster brake as applied to a bicycle wheel hub; Fig. 2 is a section on the line x—x of Fig. 1, with the hub extension omitted; Fig. 3 is a face view of the sprocket pinion; Fig. 4 is a view of that face of the hub which is contiguous to the sprocket pinion; Fig. 5 is a face view of a flange located contiguous to the pinion; and Fig. 6 is a section through a portion of the clutch members.

Referring to the drawings, there is shown the fixed axle 1 of the rear wheel of a bicycle, and this axle is provided with two ball races 2, 2, one near each end, in each of which is located a series of anti-friction balls 3. Mounted upon the axle and sustained by the anti-friction balls 3 is a sleeve 4 threaded at the end 5 to receive a flange 6 which is screwed tightly upon the sleeve 4 against an annular shoulder 4' formed thereon and which may also serve as a portion of an anti-friction ball raceway. Near the other end of the sleeve 4 from that carrying the flange 6 the said sleeve is formed with an annular rib 6' shaped for coaction with other parts to constitute a raceway for a series of anti-friction balls 7.

Mounted upon the series of balls 7 at one end and upon another series of balls 8 at the other end is a hub 9 provided with two spaced flanges 10—11 to which are secured the inner ends of spokes 12 in the usual manner employed in bicycle wheels. The series of balls 7 and 8 are seated in suitable annular grooves 13 formed in the hub to receive them. The flange 11 has formed on its outer face a circular series of tapering notches 14, and in the flange 6 is formed a similar series of tapering notches 15.

The flange 6 is spaced from the flange 11 of the hub a sufficient distance to receive the body of a sprocket wheel 16 on the periphery of which are formed sprocket teeth 17. This sprocket wheel is provided on each face with a peripheral annular flange 18 extending over the peripheries of the two flanges 6 and 11 near the tapered notches 14 and 15, respectively, therein, and interior to the flanges 18 the body portion of the sprocket wheel is traversed by passages 19, set angular to the plane of rotation of the wheel.

When the parts are assembled the sprocket wheel confines the series of balls 8 to their seats 13, and this sprocket wheel is also formed with an annular seat for this series of balls and likewise has a seat for another annular series of balls 20 which are confined in a ball race between the inner circumference of the sprocket wheel and the flange 6 and sleeve 4 and annular shoulder 4' thereon. Each passage 19 carries a number of balls 21 so arranged that when the sprocket wheel is turned in one direction these balls will engage the deeper portions of the notches 14 and so cause the rotation of the bicycle wheel in the forward direction. When, however, the sprocket wheel is moved in the other direction the balls will engage the notches in the flange 6 and so cause the rotation of the sleeve 4 to apply the brake, as will hereinafter appear. The passages 19 being inclined to the plane of rotation of the sprocket wheel will at one phase of such rotation be inclined downwardly so that the balls will gravitate into the notches 14 and thus lock the sprocket wheel to the hub so long as the sprocket wheel continues its rotation in the forward direction. At the same time the balls 21 in those passages 19 which because of the rotation of the sprocket wheel 16 are in a position to incline the other way toward the flange 6, will simply ride along the inclined edges of the notches 15 without engaging the shoulders thereof and thus failing to clutch the sprocket wheel to the sleeve 4. It is apparent, of course, that when the direction of rotation of the sprocket wheel is reversed the balls 21 will fail to clutch the hub but will clutch the flange 6.

If the thickness of the sprocket wheel is considerable then in the practical embodiment of the invention a number of balls 21 will be necessary in order that the range of travel from engagement with one series of notches into engagement with the other series of notches may be small, for otherwise the balls will not gravitate with sufficient rapidity to cause them to thoroughly clutch one member or the other, as the case may be.

Projecting from the flange 10 away from the hub and formed integral with this flange at its periphery is an overhanging annular rim 22 forming a chamber for the housing of the brake shoes to be presently described, and the inner periphery of this rim 22 constitutes the bearing face for the brake shoes. Fast on the axle 1 is a disk 23 having a hub 24, and this hub is screwed on to the threaded end of the axle 1. This axle may be flattened on the other end for the application of a wrench. Fast on the disk 23 or hub 24 is an arm 25 which may be secured in the usual manner, as by a clip 26, shown in dotted lines, to one of the side bars 27 of the bicycle frame, this bar being, if desired, one of the members of the horizontal fork projecting back from the crank hanger.

Fast on the inner face of the disk 23 is a segmental block 28 having its outer edge about coincident with the periphery of the disk, and at a point about half way between the periphery of the disk and the center thereof this block has an arm 29 to which is pivoted one end of another arm 30, to the center of which latter is fixed a segmental block 31 forming a brake shoe. To the other end of the arm 30 is pivoted a similar arm 32 having formed on it another brake shoe 33, and the arm 32, in turn, has its end remote from that connected to the arm 30 pivotally connected to an arm 34 terminating in a brake shoe 33 similar in shape to the brake shoes 31 and 33 except that instead of having the arm 34 continuing on both sides of its central point there is formed in it a notch 36, to be hereinafter referred to. Pivoted to the block 28 is a bell-crank lever 37 connected at one end by a link 38 to a clip 39 partially surrounding but fast on the sleeve 4 beyond the rib 6', the sleeve 4 being of reduced diameter at this point to receive the clip 39. The other end of the bell-crank lever carries one end of a finger 40, the other or free end of which engages in the notch 36. Because of the shape of the segmental blocks 31, 33 and 35 and the arms 30, 32 and 34 each of these blocks has formed therein opposed seats 41 in which engage the ends of curved leaf-springs 42. The ends of these springs may be slightly inset into their seats so as to be in no danger of accidental displacement therefrom. The tendency of the springs is to collapse the brake shoes toward the axis of the disk 23.

The brake shoes and the parts coacting therewith are all housed within the chamber formed by the overhanging rim 22, while the end of this chamber is closed by the disk 23, which may be made to fit therein quite snugly and, if desired, appropriate dust bands may be used. Now, when the sleeve 4 is rotated in the appropriate direction, the link 38 pulls the bell-crank lever 37 so as to force the finger 40 into engagement with the seat 36 and move the entire series of brake shoes outward around their pivots and against the action of the springs 42. By this means there is obtained a very large proportionate area of contact between the brake shoes and the inner periphery of the overhang 22, thus insuring great braking action. When the pressure upon the sprocket pinion 16 tending to reverse its movement, is relieved, the springs 42 then act to draw the shoes 31, 33 and 35 away from the overhang 22 and thus put the brake out of action. Because of the link and lever connection of the brake operating mechanism great power is obtained for forcing the brake shoes into contact with the overhang of the wheel hub, and the rider is thus enabled to bring almost any desired degree of braking action into play, without excessive exertion.

I claim:—

1. In a coaster brake, an axle, a sleeve mounted loosely thereon, a brake mechanism at one end of said sleeve, a flange at the other end of the sleeve, said flange having a circular series of taper notches formed in one face, a hub mounted on the sleeve and having spaced flanges for the attachment of the spokes, one of said flanges coacting with the brake mechanism and the other of said flanges having a circular series of taper notches formed in one face, said face being in opposed relation and spaced from the notched face of the flange on the sleeve, a driving pinion having transverse inclined passages therethrough and mounted loosely upon the sleeve between the notched flanges with the through passages in the pinion matching the notches in the flanges, and balls in said passages movable into operative relation to either of said circular series of notches.

2. In a coaster brake, a hub having at one end a clutch mechanism, and at the other end a brake mechanism composed of an annular series of interconnected brake shoes, springs acting on said brake shoes in unison to move them out of operative position, and a link and lever connection between the clutch mechanism and said brake shoes for forcing the latter against the action of the springs into operative position.

3. In a coaster brake, a driving mechanism, a brake mechanism comprising an annular series of interconnected brake shoes, springs acting on said shoes in unison to move them out of operative position, and a link and lever connection between the driving mechanism and said brake shoes for forcing them against the action of the springs into operative position.

4. In a coaster brake, a driving mechanism, a brake mechanism comprising an annular series of segmental brake shoes pivotally connected together and at one end of the series to a fixed member, springs tending to collapse the brake shoes to move them out of operative position, a bell-crank lever, a link connection between the same and the driving mechanism, and a pivoted finger carried by the bell-crank lever and engaging that end member of the series of brake shoes remote from the point of connection of the series with the fixed member.

In testimony that I claim the foregoing as my own, I have hereto affixed my signature in the presence of two witnesses.

MARK AINSWORTH.

Witnesses:
S. W. RICKETTS,
J. L. VAN WAGNER.